Patented July 12, 1932

1,867,097

UNITED STATES PATENT OFFICE

HEINRICH RITTER, OF FRANKFORT-ON-THE-MAIN-FECHENHEIM, AND ALFRED HOLL, OF OFFENBACH-ON-THE-MAIN, GERMANY, ASSIGNORS TO GENERAL ANILINE WORKS, INC., OF NEW YORK, N. Y., A CORPORATION OF DELAWARE

COMPOUNDS OF THE THIAZOLANTHRONE SULPHONE SERIES AND PROCESS OF MAKING SAME

No Drawing. Application filed November 4, 1930, Serial No. 493,463, and in Germany November 8, 1929.

Our invention relates to compounds of the thiazolanthrone sulphone series and process of making same.

We have found that the sulphur atom of the meso ring in thriazolanthrone and its nuclear substitution products can be oxidized to the sulphone group by treatment with suitable oxidizing agents usual for the conversion of organic sulphides into sulphone compounds (cf. Houben, "Methode der organischen Chemie", Vol. III (1930) page 1278) in an acid medium. In this manner when starting from thiazolanthrone itself the thiazol-anthronesulphone of the probable formula:

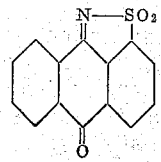

is obtained, which is identical with the anhydride of anthraquinone 1-sulphamide, described by Ullman in Ber. der deutschen Chem. Gesellschaft, vol. 52, page 550.

It appears from this fact, that by the present process of oxidation the ring system of the starting material remains unchanged.

As suitable oxidizing agents, for example, hydrogen peroxide, halogens, permanganates, used in acid medium and chromic and fuming nitric acids may be mentioned.

The present oxidation products are valuable intermediates for the production of dyestuffs. So far as they still contain one carbonyl group they are distinguished by a remarkable solubility in alkali sulphide solution and in the vat.

So far as they contain in 2 and 5 position further substituents such as a methyl or carboxylic acid group or halogen or in 5.10 position a second thiazol-sulphone ring they are new compounds unknown hitherto. These new compounds correspond to the probable general formula:

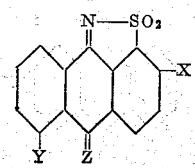

wherein X means hydrogen or a methyl or carboxylic acid group, Y means hydrogen or halogen, one X or Y standing for hydrogen, Z means oxygen or Y and Z jointly $\overset{|}{S}O_2 - \overset{\|}{N}$.

In order to further illustrate our invention the following examples are given, the parts being by weight and all temperatures in centigrade degrees. But we wish it to be understood that we are not limited to the particular conditions nor to the specific products mentioned therein.

Example 1

10 parts of thiazolanthrone are mixed with about 250 parts of glacial acetic acid and 15 parts of a hydrogen peroxide solution of about 25% strength and the mixture is heated to boiling for a short time. From the originally clear solution slowly a weakly yellowish precipitate separates slowly, which is filtered off after heating for about two hours and washed out. It crystallizes from nitrobenzene in the form of light yellow needles melting above 300°. It is vattable with an intense violet color and dissolves in a sodium sulphide solution with the same coloration. The solution in sulphuric acid is light yellow colored. According to these properties and to its analysis it has been proved identical with the anhydride of anthraquinone-1-sulphamide, described by Ullmann (l. c.) and corresponding to the formula:

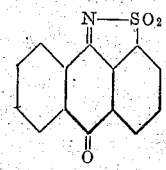

The same compound is obtained when oxidizing with chromic acid or when introducing an excess of chlorine into a dilute solution of thiazolanthrone in glacial acetic acid.

Example 2

5 parts of 2-methylthiazolanthrone are mixed with about 300 parts of glacial acid and 10 parts of a hydrogen peroxide solution of about 30% strength and the mixture is heated to boiling for about two hours. When cool the precipitate is filtered off. The new oxidation product corresponding to the probable formula:

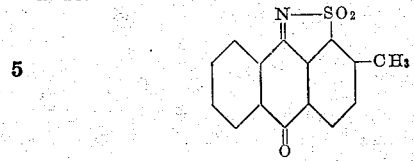

crystallizes from, for instance, monochloro benzene in the form of yellow crystals melting at about 270° with decomposition. The 2-methylthiazolanthrone-sulphone dissolves in concentrated sulphuric acid with a yellow color and is vattable with a violet-red color in contrast to the not vattable 2-methylthiazolanthrone.

It is advisable to treat 2-methylthiazolanthrone only with a weakly acting oxidant, since otherwise (when using for instance chromic acid) also the 2-methyl group is attacked.

*Example 3*

5 parts of thiazolanthrone-2-carboxylic acid are mixed with about 200 parts of glacial acetic acid and 6 parts of chromic acid and the mixture is heated to boiling for a short time. When cool the precipitated yellow crystals are filtered off and washed out. The new oxidation product represents the thiazolanthrone-sulphone-2-carboxylic acid of the probable formula:

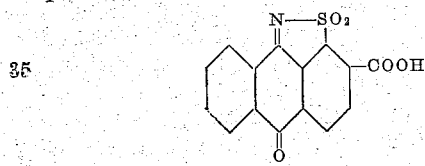

It may be purified by recrystallization from, for instance, nitrobenzene or glacial acetic acid. It is then obtained in the form of yellow needles, which are nearly colorless, soluble in dilute alkali solutions and vattable with a bluish green color.

Instead of chromic acid likewise a hydrogen peroxide solution may be used.

*Example 4*

Into a solution of 5 parts of 5-chloro-thiazolanthrone in about 100–125 parts of dilute acetic acid, which has been warmed at about 50-60°, a weak current of chlorine is introduced. After allowing the reaction mass to stand for some time by adding water thereto the formed new oxidation product is separated. It represents the 5-chloro-thiazolanthronesulphone of the probable formula:

recrystallizing from, for instance, nitrobenzene in the form of beautiful yellow crystals melting above 300°.

*Example 5*

5 parts of 1.5-dithiazolanthrone are mixed with about 200 parts of glacial acetic acid and 12 parts of a hydrogen peroxide solution of about 30% strength and the mixture is heated to boiling for about an hour. Then the separated orange crystals are filtered off, washed out and advantageously recrystallized from, for instance, nitrobenzene, from which orange crystals separate which melt above 300°. The new dithiazolanthronesulphone of the probable formula:

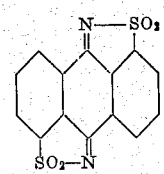

thus obtained is soluble in sulphuric acid with a yellow color, but not showing fluorescence whereas the solution of the starting material in sulphuric acid is characterized by a strong green fluorescence.

We claim:

1. A process for producing oxidation products which process comprises treating compounds of the thiazolanthrone series with an oxidant usual for the conversion of organic sulphides into sulphone compounds in an acid medium.

2. A process for producing oxidation products which process comprises treating compounds of the thiazolanthrone series dissolved in glacial acetic acid with a hydrogen peroxide solution.

3. As new products compounds of the thiazolanthrone sulphone series corresponding probably to the general formula:

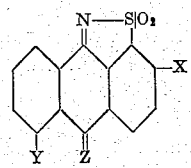

wherein X means hydrogen or a methyl or a carboxylic acid group, Y means hydrogen or halogen, one X or Y standing for hydrogen, Z means oxygen or Y and Z jointly $SO_2-N$, which products are yellowish colored crystalline substances.

4. As new products compounds of the thiazolanthrone sulphone series corresponding probably to the general formula:

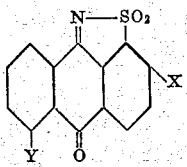

wherein X means hydrogen or a methyl or a carboxylic acid group, Y means hydrogen or chlorine, one X or Y representing hydrogen, which products are yellowish colored crystalline substances, soluble in the alkaline hydrosulphite vat.

5. As a new compound the 2-methyl-thiazolanthrone-sulphone of the probable formula:

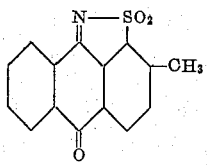

forming yellow crystals melting at about 270° with decomposition, being soluble in concentrated sulphuric acid with a yellow color and being vattable with a violet-red color.

6. As a new compound the thiazolanthrone-suphone-2-carboxylic acid of the probable formula:

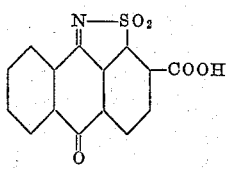

forming yellow needles, nearly colorless soluble in dilute alkali solutions and vattable with a bluish green color.

7. As a new compound the 5-chlorothiazolanthrone-sulphone of the probable formula:

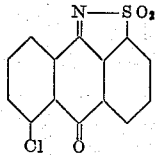

forming beautiful yellow crystals melting above 300°.

In testimony whereof, we affix our signatures.

HEINRICH RITTER.
ALFRED HOLL.